United States Patent [19]
Edmonds, Jr. et al.

[11] 3,988,286
[45] Oct. 26, 1976

[54] HEAT CURABLE POLY(ARYLENE SULFIDE) COMPOSITIONS

[75] Inventors: James T. Edmonds, Jr.; Harold Wayne Hill, Jr., both of Bartlesville, Okla.

[73] Assignee: Phillips Petroleum Company, Bartlesville, Okla.

[22] Filed: Aug. 23, 1974

[21] Appl. No.: 500,181

[52] U.S. Cl. .......................... 260/37 R; 260/37 M; 260/79; 260/79.1; 260/823; 427/384; 427/388 R; 428/419; 428/421

[51] Int. Cl.² .......................................... C08L 81/02

[58] Field of Search ........... 260/79, 79.1, 823, 37 R, 260/37 M

[56] References Cited
UNITED STATES PATENTS

| | | |
|---|---|---|
| 3,354,129 | 11/1967 | Edmonds, Jr. et al. ............ 260/79.1 |
| 3,396,110 | 8/1968 | Hill, Jr. et al. ...................... 252/42.1 |
| 3,524,835 | 8/1970 | Edmonds, Jr. et al. ............ 260/79.1 |
| 3,622,376 | 11/1971 | Tieszen et al. ..................... 260/79 |
| 3,699,087 | 10/1972 | Wood et al. ......................... 260/79 |
| 3,716,609 | 2/1973 | Trocciola et al. ................... 264/111 |

*Primary Examiner*—Melvyn I. Marquis

[57] ABSTRACT

Poly(arylene sulfide) compositions heat curable to products exhibiting improved high temperature properties are provided comprising a minor amount of alkyl-substituted cyclic repeating units and a major amount of cyclic repeating units free of alkyl substituents. The copolymers can be blended with arylene sulfide homopolymers to provide compositions exhibiting improved curing characteristics, as well as being combined with various fillers to provide coating compositions and laminates formed therefrom.

17 Claims, No Drawings

HEAT CURABLE POLY(ARYLENE SULFIDE) COMPOSITIONS

This invention relates to poly(arylene sulfide) compositions exhibiting improved curing characteristics and improved high temperature properties. In accordance with another aspect, this invention relates to arylene sulfide copolymers containing alkyl groups on some of the repeating units in the polymer chain which copolymers exhibit more facile curing properties than similar compositions without the presence of alkyl substituent groups. In accordance with another aspect, this invention relates to blends of arylene sulfide copolymers containing alkyl groups on some of the repeating units to yield a polymeric composition which cures more readily than poly(arylene sulfide) resins without alkyl groups. In accordance with a further aspect, this invention relates to coated structures comprising a substrate and an arylene sulfide copolymer containing alkyl groups on some of the repeating units as the coating composition. In accordance with still another aspect, this invention relates to laminate structures comprising a plurality of layers having an arylene sulfide copolymer containing a minor proportion of alkyl-substituted cyclic repeating units in the polymer chain as the bonding material for the laminate.

Accordingly, an object of this invention is to provide improved heat curable poly(arylene sulfide) compositions.

Another object of the invention is to provide poly(arylene sulfide) coating compositions exhibiting improved high temperature properties.

A further object of the invention is to provide laminates exhibiting improved high strength and flexural modulus properties.

A further object of this invention is to provide poly(arylene sulfide) compositions exhibiting improved cure characteristics.

Other objects, aspects, and the several advantages of the invention will be apparent to those skilled in the art upon a study of the specification and appended claims.

In accordance with the invention, heat curable arylene sulfide copolymers exhibiting enhanced cure rates and thermal stability properties are provided comprising arylene sulfide copolymers having in the polymer chain a minor amount of alkyl-substituted cyclic repeating units and a major amount of cyclic repeating units free of alkyl substituents.

In accordance with another embodiment of the invention, poly(arylene sulfide) blends having improved cure properties are provided comprising an arylene sulfide homopolymer and an arylene sulfide copolymer having a minor amount of alkyl-substituted cyclic repeating units and a major amount of cyclic repeating units free of alkyl substituents.

In accordance with still another embodiment of the invention, heat curable arylene sulfide copolymers containing minor but substantial amounts of alkyl-substituted cyclic repeating units in the copolymer chain are used as coating compositions and as bonding agents for laminate structures.

In this application, the term "homopolymer" is used in its customary sense to denote polymeric materials prepared, except for minor amounts of incidental impurities, from a single monomer. The term "copolymer" is used to denote polymeric materials prepared from two or more monomers and thus, for convenience, also extends to terpolymers and higher combinations. The term "polymer" is used broadly to denote homopolymers as well as copolymers as defined above. The term "polymer blend" denotes, in the customary sense, a combining of two or more polymers at a stage subsequent to the polymerization stage but not necessarily subsequent to the curing stage. The term "mole percent alkyl-substituted repeating unit" is used to denote the total amount of such a moiety in a given composition based on the total composition regardless of whether the composition is a copolymer or is a blend of polymers, such as a blend of an alkyl-subtituted copolymer and a non-alkyl-containing homopolymer.

I. ARYLENE SULFIDE COPOLYMERS CONTAINING ALKYL GROUPS

Copolymers of this invention can be prepared in high yield by contacting a mixture of polyhalo-substituted cyclic compounds, at least one such compound containing one or more nuclearly-substituted alkyl group, and at least one such compound without alkyl substituents, with an alkali metal sulfide in a polar organic compound at an elevated temperature.

Polyhalo-substituted compounds useful in this invention are represented by the following formulae:

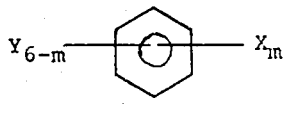

I.

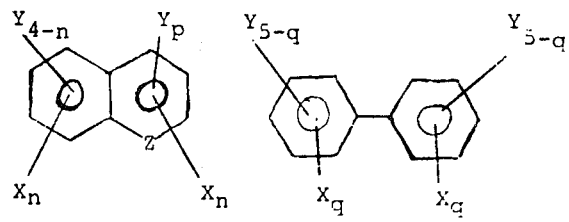

II. III.

wherein each X is a halogen selected from the group consisting of chlorine, bromine, iodine, and fluorine with chlorine being preferred; wherein each Y is either hydrogen or an alkyl group containing from one to four carbon atoms, preferably hydrogen and/or methyl group; and wherein Z is either a carbon atom or a nitrogen atom. The X's and Y's in a particular compound can be either alike or different. The number $m$ is an integer having the value form 2 to 6. The number $n$ is an integer having the value from 1 to 4. The number $p$ is a positive integer having the value $4-n$ if Z is a carbon atom or the value $3-n$ if Z is a nitrogen atom. The number q is an integer having the value from 1 to 5. The values of $n$ and $q$ for each cyclic nucleus in a compound may be alike or different. The numbers $m$, $n$, and $q$ are selected such that each compound contains at least two, and preferably only two, halogen atoms per molecule. Compounds of formula I contain from 6 to 12 carbon atoms per molecule and preferably from 6 to 8. Compounds of Formula II contain from 9 to 16, and preferably 9 to 12, carbon atoms per molecule. Compounds of formula III contain from 12 to 18 and preferably 12 to 14 carbon atoms per molecule.

Examples of polyhalo-substituted compounds represented by the above formulae useful as monomers of the present invention include p-dichlorobenzene, 2,4-dichlorotoluene, 2,5-dichloro-p-xylene, 1-n-butyl-2,5-dibromobenzene, 1,4-diethyl-2,5-dibromobenzene, 1,3,5-trifluoro-2,4,6-triethylbenzene, hexachlorobenzene, 2,6-dichloronaphthalene, 1,4-dichloro-7,8-diethylnaphthalene, 1,4-dibromo-3,5,7-triethylnaphthalene, 2-n-butyl-6-ethyl-4,8-diiodonaphthalene, 4,7-dichloroquinoline, 2-methyl-3,5,7-tribromoquinoline, 2,5-diethyl-8-n-propyl-2,3,6-trifluoroquinoline, 4,4'-dichlorobiphenyl, 3,3'-dibromo-5,5'-dimethylbiphenyl, 3,3'-diiodo-4,5'-tri-n-propylbiphenyl, and the like.

The polymers of this invention can be generally prepared as described in U.S. Pat. No. 3,354,129. The molar ratio of polyhalo-substituted compounds to metal sulfide will generally be in the range 0.9/1 to 2/1. The amount of polar organic compound can vary over a wide range from about 100 to 2500 ml per mole of metal sulfide. The reactants and polar organic compound are contacted in any suitable stirred or unstirred reactor at a temperature of from about 125° to 450° C, preferably from 175° to 350° C. The reaction time can be whatever is necessary to convert a substantial portion of the reactant to polymer and will be primarily dependent on reaction temperature and reactant reactivity.

The alkali metal sulfides useful in this invention are represented by the formula $M_2S$ which includes the monosulfides of lithium, sodium, potassium, rubidium, or cesium including either anhydrous or hydrated forms. The preferred sulfide reactant is sodium sulfide and its hydrates.

The polar organic compounds employed according to the invention are selected from amides, lactams, sulfones, etc. Specific examples of such compounds are hexamethylphosphoramide, tetramethylurea, N,N'-ethylene dipyrrolidone, N-methyl-2-pyrrolidone, caprolactam, N-ethylcaprolactam, sulfolane, dimethylacetamide, and the like. N-Methyl-2-pyrrolidone (NMP) is preferred.

The polymer, which is soluble in the hot reaction mixture in some instances, can be isolated from the crude reaction mixture by any convenient means, such as by cooling the mixture to room temperature or slightly above, washing vigorously and repeatedly with water, separating organic and aqueous phases by any suitable means, such as decantation, filtration, etc., and drying the polymer. Alternatively, the crude reaction mixture can be used without the above-described isolation scheme by simply removing by filtration, etc., the insoluble residues, such as sodium chloride, from the hot reaction mixture or by first treating the hot crude reaction mixture with an agent, such as carbon dioxide, to precipitate the soluble alkali metal ions as the insoluble carbonates followed by filtration, etc., of the insoluble residues. The resulting hot homogeneous solution of polymer in organic solvent can then be used directly to cast films for coatings or for impregnating carbon, metal or glass fibers or cloth for the preparation of high strength composites.

The composition of the mixture of polyhalo-substituted reactants, which include alkyl-substituted reactants, will be determined to a large extent by the end-use to which the cured copolymer is to be put. Copolymers containing lower amounts of alkyl groups, e.g., from 1 to about 25 mole percent alkyl-substituted cyclic repeating units, provide useful coatings for articles in which some degree of flex is required since the cured coating can be flexed without breaking or cracking. Particularly effective results are obtained when 2–10 mole percent of alkyl-substituted repeating units are present.

Polymers containing higher amounts of alkyl groups, e.g., from 25 to about 50 or more molar percent alkyl-substituted cyclic repeating units, provide harder and less flexible materials which are useful in more rigid articles.

The mole percent of alkyl-substituted repeating units in the copolymer refers to the actual amounts present in the polymer chain as determined by any suitable analytical method such as infrared spectroscopy. However, for convenience, the mole percent is ordinarily computed from the ratio of monomers in this high conversion copolymerization reaction.

The improvement of this aspect of the invention is arylene sulfide copolymers having enhanced cure rates and enhanced thermal stabilities compared to poly(arylene sulfides) without alkyl substituents. For example, a phenylene sulfide homopolymer prepared using p-dichlorobenzene cures in the air at 700° F (371° C) in 30 minutes. A comparable copolymer prepared using 6 mole percent 2,4-dichlorotoluene with p-dichlorobenzene cures to a comparable state of cure of 600° F (316° C) in 15 minutes.

Cure temperatures for the copolymers of this invention will generally be in the range 500°–750° F for whatever time produces the desired state of cure. From several minutes to several hours, for example, 0.1–24 hours, will generally be adequate to cure the polymers of this invention at the temperatures specified. The enhanced thermal stability and cure rate are observed in polymers cured in air or other oxygen-containing gas, as well as under vacuum or inert atmosphere conditions, though air curing is preferred.

II. BLENDS OF ARYLENE SULFIDE COPOLYMERS CONTAINING ALKYL-SUBSTITUTED CYCLIC REPEATING UNITS WITH OTHER POLY(ARYLENE SULFIDE) RESINS.

Another aspect of this invention pertains to blends of the above-described copolymers with other poly(arylene sulfides) which do not contain alkyl groups for the purpose of obtaining a compositon with enhanced cure rates and thermal stability compared to the poly(arylene sulfides) without alkyl groups.

Any of the arylene sulfide copolymers containing alkyl-substituted repeating units described above are useful in this aspect of the invention. Copolymers containing from 1 to about 50 or more mole percent monomeric units containing alkyl groups can be used as curing aids for non-alkyl-containing polymers. The final application for the blend will determine to a large extent the composition and amount of the copolymer used in the blend. For example, blends containing higher amounts of alkyl groups, e.g., from 20 to about 40 mole percent alkyl-substituted cyclic units, prepared using relatively large amounts of copolymer containing a substantial portion of alkyl-substituted monomer units when cured will be hard and more brittle than a blend containing smaller amounts of alkyl groups, e.g., from 1 to about 10 mole percent alkyl-substituted cyclic units, prepared using either large amount of low alkyl-containing copolymer or small amounts of high alkyl-containing copolymer. The latter blend will be more flexible and ductile than the former.

Generally speaking, sufficient alkyl-containing copolymer is blended with a non-alkyl-containing polymer to provide 1–40 mole percent alkyl-substituted cyclic repeating units in the total blend. Blends containing 1–25 mole percent, preferably 2–10 mole percent, of such units yield products of greater flexibility.

Poly(arylene sulfide) resins such as those generally described in U.S. Pat. No. 3,354,129 not containing alkyl groups can be blended with the copolymers of this invention. For example, blends of poly(phenylene sulfide) or poly(biphenylene sulfide) with copolymers prpepared using p-dichlorobenzene and 2,4-dichlorotoluene result in compositions which cure faster and at lower temperatures than the poly(phenylene sulfide) or poly(biphenylene sulfide) alone.

Blending of the polymers may be accomplished by any of a variety of ways, such as solution blending, slurry blending, dry blending, etc.

Cure temperatures for the blends of this invention will generally be in the range 500°–750° F for whatever time is required to produce the desired state of cure. From several minutes to several hours, for example, 0.1–24 hours, will generally be adequate to cure the blends of this invention at the temperatures specified. The enhanced cure rate is observed in polymers cured in air or other oxygen-containing gas, under vacuum or under inert atmosphere, though air-curing is preferred, being generally faster.

III. HIGH-STRENGTH AND THERMALLY STABLE COMPOSITIONS FROM COPOLYMERS OR BLENDS THEREOF IN COMBINATION WITH VARIOUS SUBSTRATES

The fast-curing copolymers and blends of this invention can be used to prepare high-strength and thermally stable compositions by coating substrates, such as steel or aluminum, and by impregnation of fibers or cloth of materials such as carbon, metal or glass with the copolymers or blends of this invention followed by curing under conditions appropriate for the polymers employed.

It is known in the art (U.S. Pat. No. 3,354,129) that a number of fillers, such a s graphite, carbon black, titania, glass fibers, metal powders, magnesia, asbestos, clays, wood flour, cottom floc, alpha cellulose, mica, etc., can be used with poly(arylene sulfides). Of particular importance in this invention is the discovery that polymers of this invention filled with carbon or glass fibers exhibit greater thermal stability than filled polymers which do not contain alkyl groups. Composites consisting of carbon, metal or glass cloth impregnated with polymers of this invention exhibit unusually high strength, as well as exceptional thermal stability.

Fibers of carbon or glass can be conveniently added to the polymerization system prior to or subsequent to the polymerization step in which case they are isolated with the polymer. Alternatively, carbon, glass or metal fibers or cloth can be added to a hot solution or a slurry of the polymer. Typical isolation, coating, molding, or curing procedures are employed to isolate or use the resulting filler polymer.

Single layers or multiple layers of fibers, cloth or fabric made from cotton, glass or metal can be impregnated with a hot solution or slurry of the desired copolymer or blend of this invention. Removal of solvent or dispersant, such as by evaporation, and molding and curing the resulting laminate gives strong, thermally stable composites useful as jet engine blades or cases, Wankel engine apex seals, helicopter blades, etc.

The porportion of such carbon, glass or metal materials to the copolymers or polymer blends of the present invention will vary according to the desired properties of the resulting composite. Ordinarily the weight ratio of such polymeric materials to such reinforcing agents will be in the range of 1:10 to 10:1.

Coating of the copolymers or polymer blends of this invention containing, if desired, one or more of the above-described additives onto a substrate, such as steel or aluminum, is accomplished by techniques known in the art such as by applying the polymer to the substrate in the form of a slurry in any suitable inert liquid or in the form of a powder, such as by dusting or by a fluidized bed process. Subsequent curing as described above results in a tough, thermally stable coating.

EXAMPLE I

The following run (Run 1) illustrates the preparation of a copolymer from 98 mole percent p-dichlorobenzene (DCB) and 2 mole percent 2,4-dichlorotoluene (DCT) in conjunction with sodium sulfide hydrate containing 38 weight percent water.

To a two-gallon steel reactor were charged 955 gm sodium sulfide hydrate containing 38 weight percent water and 2.5 liters N-methyl-2-pyrrolidone (NMP). Heating and nitrogen purging were begun. Water (202 ml) was condensed from the vent line during which the pot temperature increased to 405° F. To the hot solution in the reactor was added a hot (175°–200° F) previously prepared solution of 1102.5 gm p-dichlorobenzene and 24.2 gm 2,4-dichlorotoluene in 500 ml NMP. Pressure within the reactor after all ingredients were charged was 40 psig. The system was maintained at 475° F for three hours with continuous stirring. Maximum pressure during the run was 135 psig. After cooling, a light-gray liquid was obtained which was washed four times with deionized water and dried at about 212° F under vacuum. Polymer (897 gm; this yield is higher than theory — not known why) was recovered with 1.45 weight percent ash, 0.08 inherent viscosity, and 536° F melting point (by differential thermal analysis).

EXAMPLE II

The following runs illustrate the preparation of a copolymer from 96.1 mole percent p-dichlorobenzene and 3.9 mole percent 2,4-dichlorotoluene with sodium sulfide hydrate containing 38 weight percent water.

Runs 2 and 3 were conducted generally as described in Example I but using 1080 gm p-dichlorobenezene and 48.3 gm 2,4-dichlorotoluene. Results are tabulated in Table I.

TABLE I

| Run No. | Polymer Wt. | % Theory | Ash, % | Inh. Visc. | M.P. ° F |
|---|---|---|---|---|---|
| 2 | 737 | 92.5 | .89 | .07 | 527 |
| 3[a] | 771 | 96.7 | 1.4 | .02 | 509 |

[a]Malfunction occurred in heating and cooling units.

These data show polymer obtained with slightly lower melting point than obtained in Example I.

EXAMPLE III

The following runs illustrate the preparation of copolymers from 94.1 mole percent p-dichlorobenzene and 5.9 mole percent 2,4-dichlorotoluene with sodium sulfide hydrate.

Runs 4 to 11 were conducted generally as described in Example I but using 1058 gm p-dichlorobenzene and 72.5 gm 2,4-dichlorotoluene. Results are tabulated in Table II.

TABLE II

| Run No. | Polymer Wt. | % Theory | Ash, % | Inh. Visc. | M.P., °F |
|---|---|---|---|---|---|
| 4 | 700 | 87.3 | | | 522 |
| 5 | 729 | 91.0 | .67 | .08 | 522 |
| 6 | 679 | 84.6 | 1.05 | .11 | 522 |
| 7 | 703 | 87.7 | .89 | .09 | 522 |
| 8 | 680 | 84.8 | .71 | .09 | 522 |
| 9 | 774[a] | 96.5 | 1.1 | .08 | 522 |
| 10 | 726[a] | 90.6 | .74 | .07 | 522 |
| 11 | 753[a] | 93.9 | .72 | .06 | 523 |

[a]A different lot of 2,4-dichlorotoluene was used in Runs 9, 10 and 11 than was used in Runs 1–8.

These data indicate that polymer was obtained in lower yield (comparing runs 4–8 with Runs 1–3 all of which employed the same lot of 2,4-dichlorotoluene) having slightly lower melting point than Runs 2 and 3.

EXAMPLE IV

The following runs illustrate the preparation of copolymers from 91.5 mole percent p-dichlorobenzene and 8.5 mole percent 2,4-dichlorotoluene with sodium sulfide hydrate.

Runs 12 and 13 were conducted generally as described in Example I but using 1030 gm p-dichlorobenzene and 105 gm 2,4-dichlorotoluene. Results are tabulated in Table III.

TABLE III

| Run No. | Polymer Wt. | % Theory | Ash, % | Inh. Visc. | M.P., °F |
|---|---|---|---|---|---|
| 12 | 685 | 85.3 | .59 | .08 | 509 |
| 13 | 760 | 94.6 | .96 | .05 | 511 |

These data indicate that polymer was obtained having lower melting point than was observed in Example III.

EXAMPLE V

The following runs illustrate the preparation of copolymers from 78.3 mole percent p-dichlorobenzene and 21.7 mole percent 2,4-dichlorotoluene with sodium sulfide hydrate.

Runs 14 to 17 were conducted generally as described in Example I but using 884 gm p-dichlorobenzene and 266 gm 2,4-dichlorotoluene. Results are tabulated in Table IV.

TABLE IV

| Run No. | Polymer Wt. | % Theory | Ash, % | Inh. Visc. | M.P., °F |
|---|---|---|---|---|---|
| 14 | 736 | 90.1 | 1.4 | .05 | 428 |
| 15 | a | | .54 | .04 | 426 |
| 16 | a | | .91 | .04 | a |
| 17 | 742 | 91.0 | .69 | .03 | 430 |

[a]Not determined.

These data indicate that polymer was obtained having lower melting point than observed in Example IV.

EXAMPLE VI

The following runs illustrate the preparation of copolymers of varying compositions prepared from p-dichlorobenzene and 2,5-dichloro-p-xylene (DCX) with sodium sulfide hydrate.

Runs 18 to 23 were conducted generally as described in Example I but using appropriate amounts of p-dichlorobenzene and 2,5-dichloro-p-xylene. Results are tabulated in Table V.

TABLE V

| Run No. | DCB/DCX[a] Wt. | Mole | Polymer Wt. | % Theory | Ash, % | Inh. Visc. | M.P., °F |
|---|---|---|---|---|---|---|---|
| 18 | 1102/26.2 | 98/2 | 619 | 77.7 | .51 | .15 | 550 |
| 19 | 1080/52.5 | 96.1/3.9 | 548 | 68.8 | .43 | .1 | 531 |
| 20 | 1058/79 | 94.1/5.9 | 537 | 67.3 | .73 | .12 | 523 |
| 21 | 1030/125 | 91.5/8.5 | 689 | 86.4 | 1 | .12 | 504 |
| 22 | 884/289 | 78.3/21.7 | b | | .33 | .04 | b |
| 23 | 884/289 | 78.3/21.7 | 734 | 92.2 | .63 | .05 | 433 |

[a]p-Dichlorobenzene/2,5-dichloro-p-xylene ratio.
[b]Not determined.

The data indicate that the desired copolymers were prepared. The decreasing melting points with increasing amount of 2,5-dichloro-p-xylene is indicative of decreasing crystallinity in polymers.

EXAMPLE VII

The following runs illustrate the preparation of terpolymers of varying compositions prepared from p-dichlorobenzene, 2,4-dichlorotoluene, and dichloronaphthalene (a mixture consisting of 20 weight percent mixed dichloronaphthalene isomers, 72 weight percent 1-chloronaphthalene and 7 weight percent naphthalene) with sodium sulfide hydrate.

Runs 24 and 25 were conducted generally as described in Example I but using appropriate amounts of p-dichlorobenzene (DCB), 2,4-dichlorotoluene (DCT), and dichloronaphthalene (DCN). Results are tabulated in Table VI.

TABLE VI

| Run No. | DCB/DCT/DCN[a] Wt. | Mole | Polymer Wt. | Ash, % | Inh. Visc. | M.P., °F |
|---|---|---|---|---|---|---|
| 24 | 904/60/221.7 | 80/5/15 | 759 | .23 | .01 | 437 |

TABLE VI-continued

| Run No. | DCB/DCT/DCN[a] Wt. | Mole | Polymer Wt. | Ash, % | Inh. Visc. | M.P., °F |
|---|---|---|---|---|---|---|
| 25 | 1014/60.3/73.8 | 90/5/5 | 746 | b | b | 504 |

[a]p-Dichlorobenzene/2,4-dichlorotoluene/dichloro-naphthalene ratio.
[b]Not determined.

These data indicate that the desired polymers were prepared. Increasing the amount of dichloronaphthalene in the charge with a corresponding decrease in the amount of p-dichlorobenzene gave lower melting point of the resultant polymer.

EXAMPLE VIII

The following runs illustrate the preparation of terpolymers of varying compositions prepared from p-dichlorobenzene (DCB), 2,4-dichlorotoluene (DCT) and 4,7-dichloroquinoline (DCQ) with sodium sulfide hydrate.

Runs 26 and 27 were conducted generally as described in Example I but using appropriate amounts of p-dichlorobenzene, 2,4-dichlorotoluene and 4,7-dichloroquinoline. Results are tabulated in Table VII.

TABLE VII

| Run No. | DCB/DCT/DCQ[a] Wt. | Mole | Polymer Wt. | % Theory | Ash, % | Inh. Visc. | M.P., °F |
|---|---|---|---|---|---|---|---|
| 26 | 1014/60/74 | 90/5/5 | 816 | 100 | .72 | .06 | 518 |
| 27 | 904/60/223 | 80/5/15 | b | — | .71 | .06 | 486 |

[a]p-Dichlorobenzene/2,4-dichlorotoluene/4,7-dichloro-quinoline ratio.
[b]Not determined.

These data indicate that the desired polymers were prepared. Increasing the amount of 4,7-dichloroquinoline in the charge with a corresponding decrease in the amount of p-dichlorobenzene gave lower melting point of the resultant polymer.

EXAMPLE IX

The following run illustrates the preparation of a terpolymer from 80 mole percent p-dichlorobenzene, 15 mole percent m-dichlorobenzene and 5 mole percent 2,4-dichlorotoluene with sodium sulfide hydrate.

Run 28 was conducted generally as described in Example I but using 904 gm p-dichlorobenzene, 165 gm m-dichlorobenzene and 60 gm 2,4-dichlorotoluene. Polymer was obtained (725 gm, 90.6% of theory) having 1.99 percent ash, 0.06 inherent viscosity and 432° F melting point. The melting point is considerably lower than polymers prepared using only the para isomer of dichlorobenzene (see Example III) indicating successful preparation of the desired polymer.

EXAMPLE X

A test was devised to determine the state of cure of the above-described polymers and other poly(arylene sulfides) as a function of cure time and temperature. From the data obtained in this test relative rates of cures were obtained.

The test consisted of degreasing with acetone coldrolled steel panels 3 in. × 6 in. × .035 in. and heating them in a gas-oxygen flame to a blue-gray color. After the panels were cooled to room temperature, three coats of the formulation (3 parts by weight polymer, 1 part by weight titanium dioxide and 6 parts by weight propylene glycol mixed in a Waring blender) were applied with a coating rod. Each coat of formulation was baked at the specified time and temperature later.

After the third coat was baked, the coated panel was annealed for two hours at 450° F and then allowed to stand overnight at room temperture. The coated panels were bent 180° over a 3/16-inch diameter rod, then straightened, and the elongated portions were examined at 20-× magnification. Numerical ratings of 1 to 5 correspond to the following observations:

| Rating | Observation |
|---|---|
| 1 | No cracking on elongation portion. |
| 2 | Occasional microcracks. |
| 3 | Numerous microcracks and some cracking which may be barely visible to the unaided eye. |
| 4 | Cracks are continuous and easily visible. |
| 5 | Complete rupture of coating. |

Application of the above-described test to the polymer in Examples I to IX gave the results tabulated in Table VIII.

TABLE VIII

| | Polymer | | Coating Test[a] | | | | |
|---|---|---|---|---|---|---|---|
| Run No. | Monomers | Mole Ratio | 700–30 | 700–15 | 600–30 | 600–15 | 550–30 |
| 1 | DCB/DCT | 98/2 | 1 | 1 | 4 | 4 | |
| 2 | DCB/DCT | 96/4 | 1 | 1 | 1 | 4 | |
| 3 | DCB/DCT | 96/4 | 1 | 1 | 1 | 3 | |
| 4 | DCB/DCT | 94/6 | 1 | 1 | 1 | 1 | 4 |
| 5 | DCB/DCT | 94/6 | 1 | 1 | 1 | 1 | |
| 6 | DCB/DCT | 94/6 | 1 | 1 | 1 | 3 | |
| 7 | DCB/DCT | 94/6 | 1 | 1 | 1 | 1 | |
| 8 | DCB/DCT | 94/6 | 1 | 1 | 1 | 1 | |
| 9 | DCB/DCT | 94/6 | 1 | 1 | 1 | 1 | |
| 10 | DCB/DCT | 94/6 | 1 | 1 | 1 | 1 | |
| 11 | DCB/DCT | 94/6 | 1 | 1 | 1 | 1 | |
| 12 | DCB/DCT | 91.5/8.5 | 5 | 1 | 1 | 1 | 4 |
| 13 | DCB/DCT | 91.5/8.5 | 2 | 1 | 1 | 1 | |

TABLE VIII-continued

| Run No. | Polymer Monomers | Mole Ratio | Coating Test[a] 700-30 | 700-15 | 600-30 | 600-15 | 550-30 |
|---|---|---|---|---|---|---|---|
| 14 | DCB/DCT | 78/22 | (Failed) | | | | 4[b] |
| 15 | DCB/DCT | 78/22 | 5 | 5 | 3 | 3 | |
| 16 | DCB/DCT | 78/22 | (Not determined) | | | | |
| 17 | DCB/DCT | 78/22 | 5 | 5 | 5 | 5 | |
| 18 | DCB/DCX | 98/2 | 1 | 1 | 1 | 3 | |
| 19 | DCB/DCX | 96/4 | 1 | 1 | 1 | 1 | |
| 20 | DCB/DCX | 94/6 | 1 | 1 | 1 | 1 | |
| 21 | DCB/DCX | 91.5/8.5 | 5 | 5 | 1 | 1 | |
| 22 | DCB/DCX | 78/22 | (Not determined) | | | | |
| 23 | DCB/DCX | 78/22 | (Not determined) | | | | |
| 24 | DCB/DCT/DCN | 80/5/15 | 5 | | 4 | | 5[b] |
| 25 | DCB/DCT/DCN | 90/5/5 | 2 | | | | 5[b] |
| 26 | DCB/DCT/DCQ | 90/5/5 | 1 | | 2 | | |
| 27 | DCB/DCT/DCQ | 80/5/15 | 5 | | 3 | | 1[b] |
| 28 | DCB | 100/0 | | 2[c] | 3 | 3 | |

[a]Column headings are cure temperature in °F – cure time in minutes for each coat.
[b]Cured at 500° F for 30 minutes.
[c]Cured at 700° F for 10 minutes.

Several conclusions can be drawn from the data in Table VIII. Copolymers prepared from p-dichlorobenzene containing up to about 9 mole percent 2,4-dichlorotoluene cure at temperatures and/or times lower than are required for the curing of poly(phenylene sulfide). For example, Runs 4–13 shown that polymers prepared using from 6 to 8.5 mole percent 2,4-dichlorotoluene cure at 600° F in 15 minutes to a state comparable to that reached by poly(phenylene sulfide) at 700° F for 10 minutes. Higher amounts of 2,4-dichlorotoluene resulted in overcuring at higher temeratures (Runs 12 to 17) as shown by increasing brittleness. From Runs 18 to 23 describing polymers prepared from p-dichlorobenzene and 2,5-dichloro-p-xylene the same conclusions can be reached as were reached for polymers using 2,4-dichlorotoluene as co-monomer with p-dichlorobenzene. The data derived from the terpolymers of Runs 24 to 27 are not conclusive but indicate lower cure temperature-time requirements than the control homopolymer.

EXAMPLE XI

The polymer prepared in Run 4 using 94.1 mole percent p-dichlorobenzene and 5.9 mole percent 2,4-dichlorotoluene was further examined in the coating tests generally described in Example X. A single coat of polymer (as a slurry in propylene glycol without filler) was applied to an aluminum panel and was cured at 600° F for varying lengths of time. Following baking the coatings were annealed for the usual two hours at 450° F. Curing for from one to 24 hours produced coatings which all gave a "1" rating after being bent (see Example X). These data indicate that this polymer was not overcurred or embrittled during prolonged heating at 600° F.

EXAMPLE XII

The following runs illustrate the use of the polymer prepared in the Run 14 using 21.7 mole percent 2,4-dichlorotoluene in blends with commercial poly(phenylene sulfide).

Runs 28 to 31 were conducted generally as described in Example I with polymer blends of varying compositions. The data are tabulated in Table IX.

TABLE IX

| Run No. | Blend Homo[a] | Co[b] | Coating Test 600-45 | 600-30 | 600-15 |
|---|---|---|---|---|---|
| 28 | 1 | 0 | 3 | 3 | 3 |
| 29 | 95 | 5 | | 3 | 3 |
| 30 | 9 | 1 | 1 | 2 | 3 |
| 31 | 3 | 1 | | 1 | 2 |
| 32 | 1 | 1 | | 5 | 2 |

[a]Homopolymer — poly(phenylene sulfide), parts by weight in blend.
[b]Copolymer — Run 14, parts by weight.

These data indicate that addition of a copolymer prepared using 78.3 mole percent p-dichlorobenzene and 21.7 mole percent 2,4-dichlorotoluene to poly(-phenylene sulfide) resulted in a blend having lower cure temperature and time requirements than the homopolymer alone. Using up 25 weight percent copolymer in the blend gave blends containing up to about 6 mole percent monomeric units with methyl groups. These blends exhibited increasing cure rates with increasing amounts of copolymer. At 50 weight percent copolymer, corresponding to about 11 mole percent methyl-containing monomer units, the blend overcured and embrittled in 30 minutes curing at 600° F.

EXAMPLE XIII

The polymer prepared in Run 14 using 21.7 mole percent 2,4-dichlorotoluene was used to impregnate carbon fibers. The following runs illustrate the use of carbon fiber and polymer in a 2 to 1 weight ratio, respectively, under various curing conditions to prepare high strength compositions.

Runs 33 to 44 were conducted by first dissolving the polymer from Run 14 in boiling N-methyl-2-pyrrolidone (NMP) using amounts to prepare 10 to 20 weight percent solutions (e.g., 6 gm polymer in 40 ml NMP). The hot polymer solution was poured over hot (approximately 400° F) unidirectional carbon fibers (.00033 in. diameter, 250,000 to 350,000 psi tensile strength, $50 \times 10^6$ to $60 \times 10^6$ tensile modulus), the weight of which was double the polymer weight (e.g., 12 gm carbon fibers for 6 gm polymer). Evaporation of the NMP under vacuum at 210° to 250° F gave a solid composition which was cured under conditions described in Table X. Results are tabulated in Table X.

TABLE X

| Run No. | Cure Temp. | Cure Time | Cure Atm. | Post-Cure Temp. | Post-Cure Time | Post-Cure Atm. | Flex. Mod. psi × 10⁻³ RT | Flex. Mod. psi × 10⁻³ 300F | Flex. Mod. psi × 10⁻³ 500F | Flex. Strength, psi at 500F |
|---|---|---|---|---|---|---|---|---|---|---|
| 33 | 600F | 2 hr | Air | — | — | — | 21,293 | | | 124,750[a] |
| 34 | 600F | 2 hr | Air | — | — | — | 22,844 | 1,438 | | |
| 35 | 600F | 4 hr | Air | — | — | — | 30,580 | 6,892 | | 9,510 |
| 36 | 600F | 4 hr | Vac. | — | — | — | 21,106 | 3,400 | | 4,050 |
| 37 | 600F | 6 hr | Vac. | — | — | — | 25,454 | 6,246 | | 9,430 |
| 38 | 600F | 2 hr | Air | 600F | 23 hr | Air | 8,840[b] | 6,858[b] | | 22,170 |
| 39[c] | 600F | 4 hr | Air | 500F | 98 hr | Air | 19,264 | 19,900 | 17,021 | 37,260 |
| 40 | 600F | 4 hr | Vac. | 500F | 16 hr | Air | 21,730 | 19,875 | 10,290 | 20,400 |
| 41 | 600F | 4 hr | Vac. | 600F | 4 hr | Air | 23,365 | 11,235 | | 17,650 |
| 42 | 600F | 4 hr | Vac. | 600F | 8 hr | Air | 23,885 | 15,421 | 13,220 | 24,880 |
| 43 | 600F | 4 hr | Vac. | 600F | 16 hr | Air | 22,896 | 17,881 | 14,800 | 33,100 |
| 44 | 600F | 4 hr | Vac. | 700F and 800F | 2 hr 1 hr | Vac. Vac. | 25,191 | 22,252 | 22,230 | 70,000 |

[a]Measured at room temperature.
[b]Reason for low flexural modulus values is not known.
[c]Composition prepared from 12 gm carbon fibers and 7 gm polymer.

The above data show that compositions of high flexural modulus and high flexural strength were prepared by impregnating carbon fibers with the copolymer from Run 14. Runs 33 to 37 show that, without post-curing, higher flexural moduli were obtained at longer cure times in either vacuum or air with air being slightly better. Runs 38 to 44 show that increasing the post-cure time and/or temperature likewise increased the flexural moduli and flexural strengths. These data also show a significant improvement in high temperature properties (flexural modulus at 300° or 500° F and flexural strength at 500° F) with increased post-cure (aging) time or temperature.

EXAMPLE XIV

The following runs illustrate the preparation of high strength laminates by impregnating layers of carbon cloth with poly(arylene sulfides).

In runs 45 and 46 a hot solution of polymer in NMP consisting of about 25 weight percent polymer was poured over 8 layers of carbon cloth arranged with the warp of each layer in alternate directions. To 52 gm carbon cloth was applied 27 gm polymer. Following solvent removal at 300° F under vacuum, the composite was cured at 600° F for six hours under 2.5 tons per square inch pressure. The polymer for Run 45 was prepared in Run 14 using monomers containing 21.7 mole percent, 2,4-dichlorotoluene and that for Run 46 was prepared in Run 22 using monomers containing 21.7 mole percent 2,5-dichloro-p-xylene. The data are tabulated in Table XI.

TABLE XI

| Run No. | Co-monomer | Flex. Mod. psi × 10⁻³ | Tensile Break, psi | Elong., % | Izod Impact, Ft. lb. | Flex. Strength, psi |
|---|---|---|---|---|---|---|
| 45 | DCT | 1974 | 15,900 | 3 | 3.90 | 26,430 |
| 46 | DCX | 1794 | 14,070 | 3 | 4.31 | 18,170 |

These data illustrate the high strength compositions obtained by means of this invention.

EXAMPLE XV

The following runs illustrate the preparation of high strength laminates by impregnating layers of glass cloth with poly(arylene sulfides).

In Runs 50 to 58 eight layers of glass cloth were impregnated with polymer. In Run 50 the polymer was applied as a slurry in water containing about 9 volume percent acetone. In Runs 51 to 57 the polymer was dissolved in boiling NMP and the hot solution was poured over the layers of glass cloth. The compositions were dried at 300° F and molded and cured as described in Table XII. In run 58 nine layers of polymer film and eight layers of glass cloth were alternately assembled and the sandwich was then molded and cured as described in Table XII. Properties of the cured compositions are given in Table XIII. The polymers for these runs were prepared as follows: Run 50 — polymer from Run 10; Run 51 — polymer from Run 14; Runs 52 to 56 — polymer from Run 16; and Run 57 — polymer from Run 23.

TABLE XII

| Run No. | Comonomer | (Mole %) | Composition (Parts) Glass | Composition (Parts) Polymer | Cure Temp.,°F | Cure Time,hrs. |
|---|---|---|---|---|---|---|
| 50 | DCT | (5.9) | 2 | 1 | 600–700 | 2 |
| 51 | DCT | (21.7) | 1.45 | 1 | 600 | 6 |
| 52 | DCT | (21.7) | 2 | 1 | 600–700 | 2 |
| 53 | DCT | (21.7) | 1.45 | 1 | 600–700 | 2 |
| 54 | DCT | (21.7) | 2 | 1 | 700 | 4 |
| 55 | DCT | (21.7) | 2 | 1 | 700 | 4 |
| 56 | DCT | (21.7) | 1.45 | 1 | 700 | 4 |
| 57 | DCX | (21.7) | | | 600 | 6 |

TABLE XII-continued

| Run No. | Comonomer | (Mole %) | Composition (Parts) Glass | Polymer | Cure Temp.°F | Time,hrs. |
|---|---|---|---|---|---|---|
| 58 | None[a] | | 2 | 1 | 700 | 4 |

[a] Control run using commercial poly(phenylene sulfide).

TABLE XIII

| Run No. | Flex. Mod., psi × 10⁻³ | | | | Tensile psi × 10⁻³ | | |
|---|---|---|---|---|---|---|---|
| | RT | 300F | 500F | 600F | RT | 300F | 500F |
| 50 | 3028 | 2247 | 1906 | | | | |
| 51 | 3189 | | | | 42 | | |
| 52 | 2524 | 2275 | 1536 | | 39.15 | 23.06 | |
| 53 | 2420 | 2293 | 1585 | | 22.17 | 22.76 | 15.91 |
| 54 | 2182 | 2220 | 1571 | | 24.85 | 21.74 | |
| 55 | 2938 | | 2470 | 2309 | | | |
| 56 | 2427 | 2390 | 2242 | | 34.73 | 18.47 | 24.45 |
| 57 | 3123 | | | | 41.92 | | |
| 58 | 2965 | | 2108 | 339[a] | | | |

[a] Sample delaminated.

TABLE XIII-A

| Run No. | Izod Impact Ft. lb. | Flex. Strength, psi × 10⁻³ | | | |
|---|---|---|---|---|---|
| | | RT | 300F | 500F | 600F |
| 50 | | 44.1 | 12.08 | 8.06 | |
| 51 | 5.05 | 34.22 | | | |
| 52 | 14.4 | 34.94 | 27.17 | 13.84 | |
| 53 | | 30.27 | 28.88 | 24.87 | |
| 54 | 11.53 | 22.3 | 16.24 | 19.19 | |
| 55 | | 45.59 | | 18.91 | 23.81 |
| 56 | | 24.53 | 38.16 | 17.24 | |
| 57 | 21.1 | 28.56 | | | |
| 58 | | 35.09 | | 5.98 | 0.71[a] |

[a] Sample delaminated.

The above data illustrate the high strength compositons prepared in this invention from glass cloth and poly(arylene sulfides). Particularly noteworthy is the retention of good properties at elevated temperatures of the compositions based on polymers of this invention containing alkyl groups compared to a commercial poly(phenylene sulfide) in Run 58. The properties measured at 600° F emphasize this remarkable thermal stability in the polymers of this invention (compare Runs 55 and 58).

We claim:

1. A heat curable poly(arylene sulfide) blend composition exhibiting enhanced cure rates and enhanced thermal stability properties in comparison with poly(arylene sulfides) without alkyl groups which comprises
   a. an arylene sulfide homopolymer free of alkyl substituents in the polymer chain and
   b. an arylene sulfide copolymer having in the polymer chain 1–50 mole percent alkyl-substituted monomeric cyclic repeating units and 99–50 mole percent monomeric cyclic repeating units free of alkyl substituents with the further proviso that the amount of said copolymer present in the blend is sufficient to provide 1–40 mole percent alkyl-substituted cyclic repeating units in the total blend.

2. A blend according to claim 1 wherein (a) is poly(phenylene sulfide) and (b) is a copolymer formed from p-dichlorobenzene and 2,4-dichlorotoluene.

3. A thermally cured polymeric composition according to claim 1.

4. A composition according to claim 1 wherein (b) is a copolymer formed from p-dichlorobenzene and 2,4-dichlorotoluene.

5. A composition according to claim 1 wherein (b) is a copolymer formed from p-dichlorobenzene and 2,5-dichloro-p-xylene.

6. A composition according to claim 1 wherein (b) is a copolymer formed from p-dichlorobenzene, 2,6-dichloronaphthalene, and 2,4-dichlorotoluene.

7. A composition according to claim 1 wherein (b) is a copolymer formed from p-dichlorobenzene, 4,7-dichloroquinoline, and 2,4-dichlorotoluene.

8. A composition according to claim 1 wherein (b) is a copolymer formed from p-dichlorobenzene, m-dichlorobenzene, and 2,4-dichlorotoluene.

9. A composition according to claim 1 wherein (b) is a copolymer having in the polymer chain from 2 to 10 mole percent alkyl-substituted cyclic repeating units.

10. A composition according to claim 1 wherein the blend contains from 50–95 weight percent of and from 50–5 weight percent of (b).

11. A high strength polymeric composition comprising the polymeric blend of claim 1 reinforced with (c) at least one of carbon, glass or metal wherein the weight ratio of the polymeric blend to reinforcing agent is 1:10 to 10:1.

12. A thermally cured composition according to claim 11.

13. A composition exhibiting high flexural modulus and high flexural strength according to claim 11 wherein the polymeric blend is a mixture of poly(phenylene sulfide) and a copolymer formed from p-dichlorobenzene and 2,4-dichlorotoluene and (c) is carbon fibers and said composition has been heated at an elevated temperature and for a period of time sufficient to effect cure.

14. A process for reducing the cure time of poly(arylene sulfide) resins when heated to an elevated temperature sufficient to effect cure which comprises forming a blend containing an arylene sulfide homopolymer free of alkyl substitutents in the polymer chain and of an arylene sulfide copolymer having in the polymer chain 1–50 mole percent alkyl-substituted monomeric cyclic repeating units and 99–50 mole percent monomeric cyclic repeating units free of alkyl substituents with the further proviso that the amount of said copolymer present is sufficient to provide 1–40 mole percent alkyl-substituted cyclic repeating units in the total polymeric blend, and heating said blend at an elevated temperature and for a period of time sufficient to effect cure to yield a product having improved high temperature physical properties.

15. A process according to claim 14 wherein the copolymer is formed from p-dichlorobenzene and 2,4-dichlorotoluene, and said blend is heated at an elevated temperature in the range of 500°–750° F.

16. A process for reducing the cure time of poly(arylene sulfide) resins when heated to an elevated temperature sufficient to effect cure which comprises forming a blend containing an arylene sulfide homopolymer free of alkyl substituents in the polymer chain and an arylene sulfide copolymeric reaction product having in the polymer chain 1–50 mole percent alkyl-substituted monomeric cyclic repeating units and 99–50 mole percent monomeric cyclic repeating units free of alkyl substituents with the further proviso that the amount of said copolymer present is sufficient to provide 1–25 mole percent alkyl-substituted cyclic repeating units in the total polymer blend, and heating said blend at an elevated temperature in the range of about 500°–750° F and for a period of time sufficient to effect cure to yield a product having improved high temperature physical properties.

17. A process according to claim 16 wherein the amount of homopolymer present in the blend is in the range of 50–95 weight percent and the amount of copolymer present in the blend is in the range of 50–5 weight percent.

* * * * *